United States Patent [19]

Umezawa

[11] Patent Number: 5,248,016
[45] Date of Patent: Sep. 28, 1993

[54] LOCK-UP CLUTCH FOR A TORQUE CONVERTER

[75] Inventor: Shigeki Umezawa, Fukuroi, Japan

[73] Assignee: NSK-Warner K.K., Tokyo, Japan

[21] Appl. No.: 858,091

[22] Filed: Mar. 26, 1992

[30] Foreign Application Priority Data

Mar. 28, 1991 [JP] Japan .................................. 3-64593

[51] Int. Cl.⁵ ...................... F16H 45/02; F16D 13/74
[52] U.S. Cl. ................................ 192/3.28; 192/113 B
[58] Field of Search ...................... 192/3.28, 3.29, 3.3, 192/113 B

[56] References Cited

U.S. PATENT DOCUMENTS

| | | | |
|---|---|---|---|
| 2,404,657 | 7/1946 | Roberts et al. | 192/3.29 |
| 3,002,595 | 10/1961 | Weir | 192/113 B X |
| 3,213,988 | 10/1965 | Maurice et al. | 192/113 B X |
| 3,435,936 | 4/1969 | Warman | 192/113 B |
| 3,530,965 | 9/1970 | Wilson | 192/113 B |
| 3,648,814 | 3/1972 | Barren | 192/113 B |
| 3,966,031 | 6/1976 | Peterson et al. | 192/3.3 |
| 3,972,397 | 8/1976 | Cheek | 192/3.3 |
| 4,445,599 | 5/1984 | Bopp | 192/113 B X |
| 4,674,616 | 6/1987 | Mannino | 192/113 B X |
| 4,969,543 | 11/1990 | Macdonald | 192/3.29 |

FOREIGN PATENT DOCUMENTS

| | | |
|---|---|---|
| 64-30936 | 2/1989 | Japan . |
| 1-128057 | 8/1989 | Japan . |
| 2-102963 | 4/1990 | Japan . |
| 847590 | 9/1960 | United Kingdom ............ 192/113 B |

*Primary Examiner*—Rodney H. Bonck
*Attorney, Agent, or Firm*—Shapiro and Shapiro

[57] ABSTRACT

Lubricating oil is appropriately supplied to the lock-up clutch facing of a torque converter to thereby prevent heat generation during sliding engagement. Oil grooves are formed in that surface of the core plate 5 of the clutch to which the facing 3 is attached, whereby the oil is supplied from the back of the facing 3. The oil grooves preferably contain pressure-differential or centrifugal-force responsive valves.

6 Claims, 11 Drawing Sheets

LOCK-UP CLUTCH FOR A TORQUE CONVERTER

BACKGROUND OF THE INVENTION

1. Field of the Invention

This invention relates to a torque converter, and particularly to a lock-up clutch for use in a lock-up torque converter.

2. Related Background Art

FIG. 1 and 2 of the accompanying drawings illustrate the function of the clutch facing 3 of a lock-up clutch 2 in a torque converter 1.

The lock-up clutch 2 urges the facing 3 against a converter cover 4 by pressure rise in the torque converter 1 and transmits power by a frictional force. The facing 3, as shown in FIG. 2, is of a circular ring shape in which inner and outer marginal edges a and b form smooth concentric circles.

Such a clutch facing 3 assumes a very high temperature due to friction heat created when it is slide-coupled to the converter cover 4 and therefore, it is necessary to cool the slide surface thereof effectively. Applicant, paying attention to this problem, has proposed a facing structure improved in cooling characteristic in Japanese Patent Application No. 63-254772 (laid-open under Publication No. 2-102963). FIG. 12 of the accompanying drawings shows a facing 3 thus proposed as it is mounted on a core plate 5. In FIG. 12, the reference numeral 20 designates a plurality of oil grooves radially formed in the back of the facing 3 (the surface thereof adhesively secured to the core plate 5). Oil circulating in these oil grooves is absorbed by the facing 3 and functions as a coolant during the frictional engagement of the facing with the converter cover.

In the above-mentioned patent application, oil grooves are formed in the facing itself, but it has been found that since the grooves are formed by severing fiber which is the material of the facing, this facing structure has the disadvantage that the shearing strength of the facing is reduced. Therefore, it has become clear that when an excessively great torque is applied to the lock-up clutch, the peeling or destruction of the facing may occur from the oil groove portions.

Recently, there has been a trend toward increased input torque resulting from the higher output of an engine, with the result that the amount of heat to which the clutch facing is subjected increases. To cope with this, it is effective to increase the num and cross-sectional areas of the oil grooves, but too great a quantity of oil flowing in the grooves may result in a decrease in the pressure difference between the front and rear of a clutch plate and thus, a reduction in the capacity of the clutch.

SUMMARY OF THE INVENTION

The present invention has been made in view of the above-noted inconvenience of the prior art and an object thereof is to provide a structure which makes the supply of sufficient cooling oil possible and, yet does not cause a reduction in the strength of the facing.

Another object of the present invention is to realize a lock-up clutch of such structure that sufficient supply of lubricating oil is possible without undue reduction in the capacity of the clutch.

The present invention achieves the above objects by forming oil grooves on that surface of a core plate which is adhesively secured to the facing.

Also, the present invention realizes a lock-up clutch mechanism little reduced in capacity by providing in each of the oil grooves a valve adapted to be opened and closed by an oil pressure difference or a centrifugal force.

Because of the above-described construction, the present invention secures the same supply rate of cooling oil as that in the aforedescribed example of the prior art and yet solves the problem of destruction resulting from a reduction in the strength of the facing. The strength of adhesive securement between the core plate and the facing amounts to about seven times the shearing strength of the facing itself and therefore, unlike the case where grooves are formed in the facing, the problem of destruction or peeling does not arise.

Also, the valve mechanisms provided in the oil grooves make the setting of proper clutch oil pressure possible and therefore, the friction characteristic and peeling life of the facing can be improved.

BRIEF DESCRIPTION OF THE DRAWINGS

FIGS. 3A-1 to 3A-4 show embodiments of the present invention.

FIGS. 4A-1 to 4A-4 show embodiments of the present invention.

FIGS. 5A-1 to 5A-4 show embodiments of the present invention.

DESCRIPTION OF THE PREFERRED EMBODIMENTS

FIGS. 3 to 6 show embodiments of a lock-up clutch according to the present invention.

Figure 1:
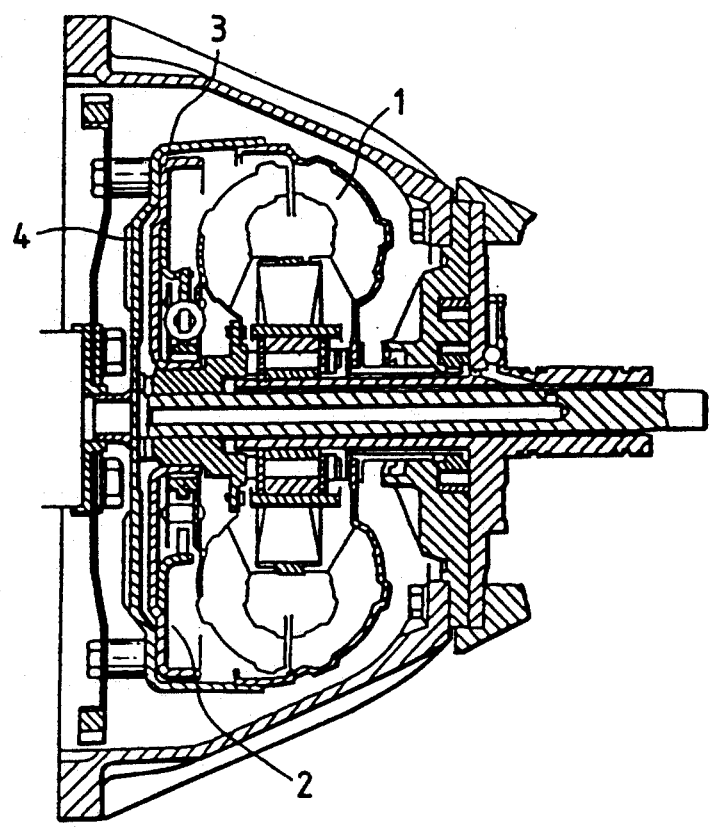
FIG. 1 shows the mechanism of a torque converter having a lock-up clutch.
Figure 2A:
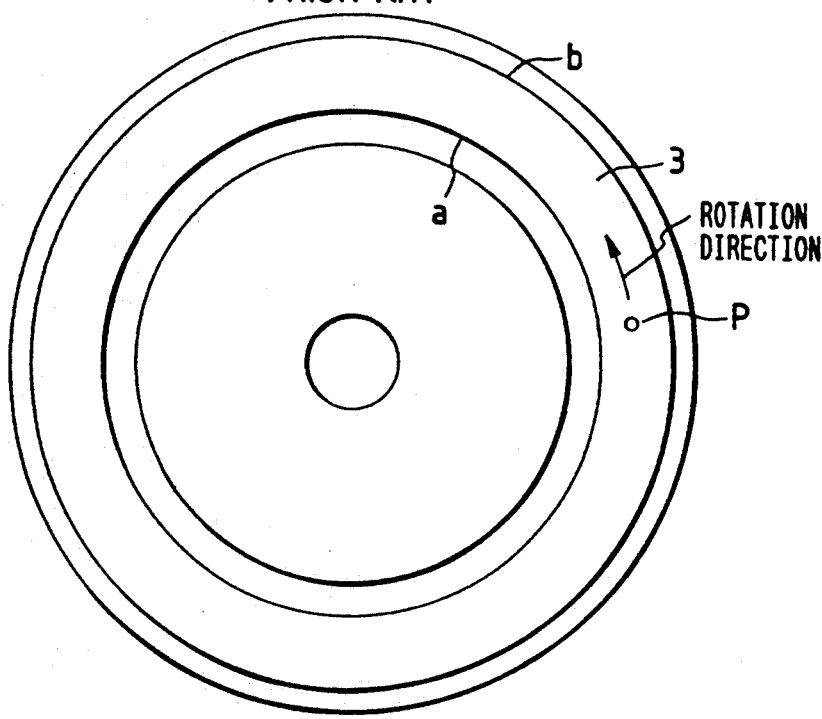
FIGS. 2A and 2B show the connected state of the core plate and facing of a lock-up clutch according to the prior art.
Figure 2B:
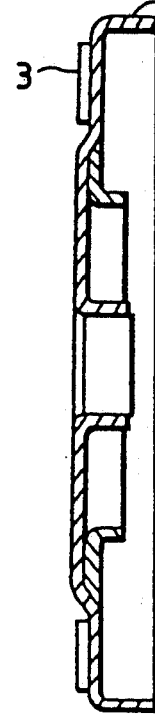
Figures 1, 3A:
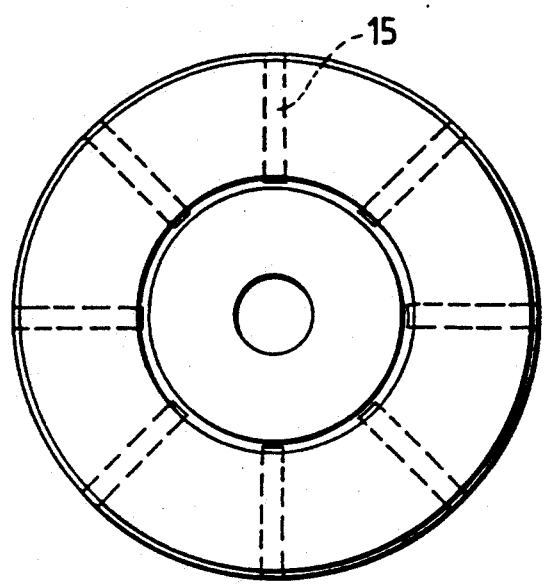
Figures 2, 3A:
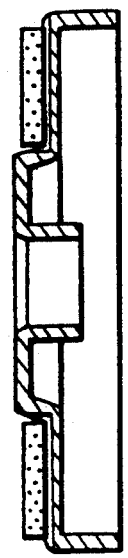

FIGS. 3A-1 and 3A-2 show an embodiment in which oil grooves are formed over the full width of an annular core plate mounting surface for the clutch facing. The opposite ends of each groove 15 are opened at the edges of the inner and outer peripheries of the mounting surface, and the grooves extend radially.

Figures 3, 3A:
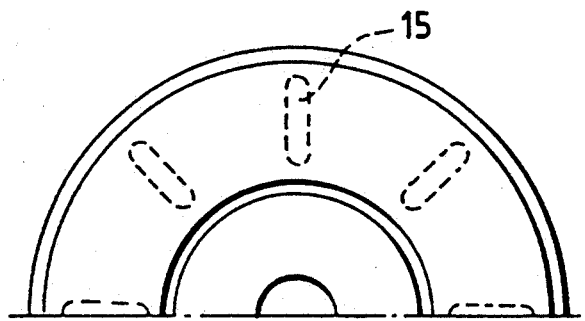
Figures 3, 3A, 4:
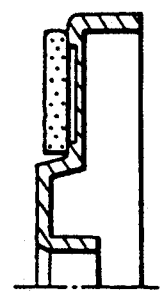
Figures 1, 4A:
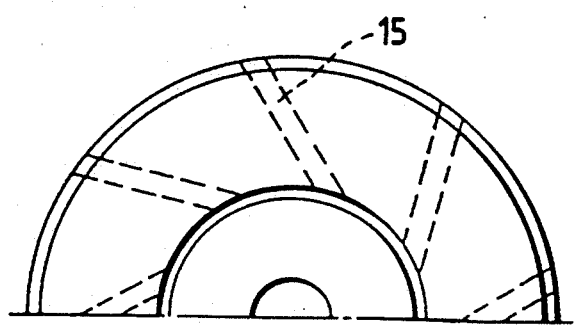
Figures 2, 4A:
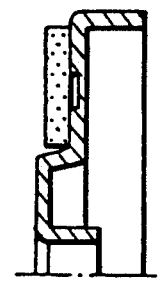
Figures 3, 4A:
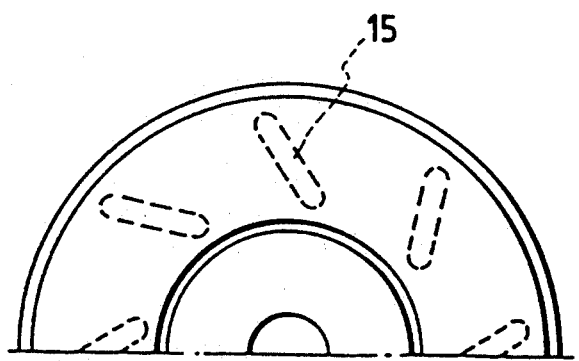
Figures 4, 4A:
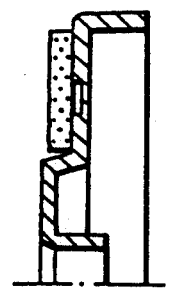

FIGS. 3A-3 and 3A-4 show an embodiment in which the opposite ends of each groove are closed.

FIGS. 4A-1 and 4A-2 and FIGS. 4A-3 and 4A-4 show embodiments in which the oil grooves are similar to those in the embodiments of FIGS. 3A-1 and 3A-2 and FIGS. 3A-3 and 3A-4, except that they are inclined so as to be non-radial.

Figures 1, 5A:
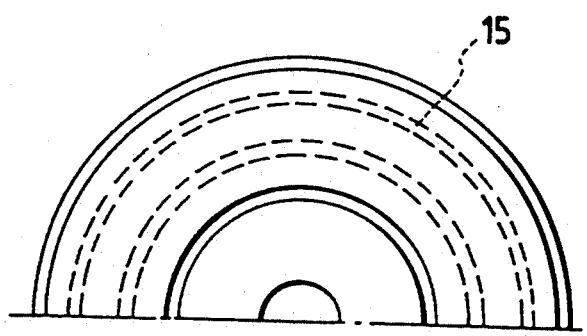
Figures 2, 5A:
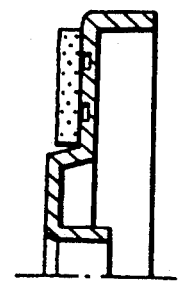
Figures 3, 5A:
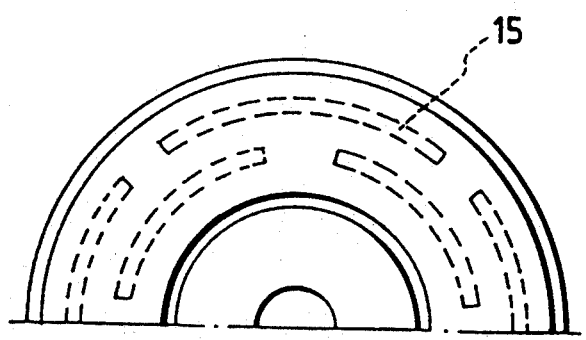
Figures 4, 5A:
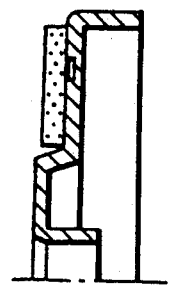

FIGS. 5A-1 and 5A-2 show an embodiment in which two oil grooves extend continuously in the circumferential direction, and FIGS. 5A-3 and 5A-4 show an embodiment in which oil grooves extending in the circumferential direction are made intermittent.

Figure 6A:
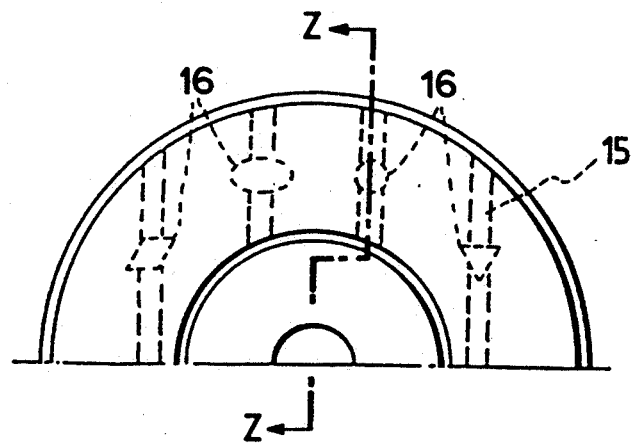
FIGS. 6A and 6B show an additional embodiment of the present invention.
Figure 6B:
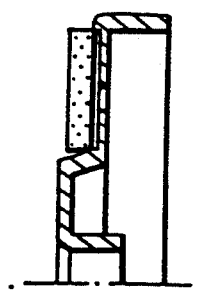
Figure 7A:
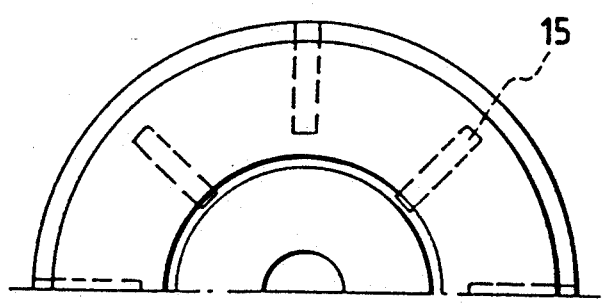
FIGS. 7A and 7B show a modification of the embodiment of FIGS. 6A and 6B.
Figure 7B:
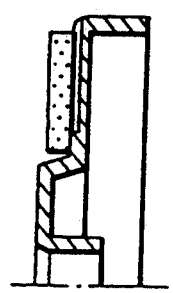
Figure 8A:
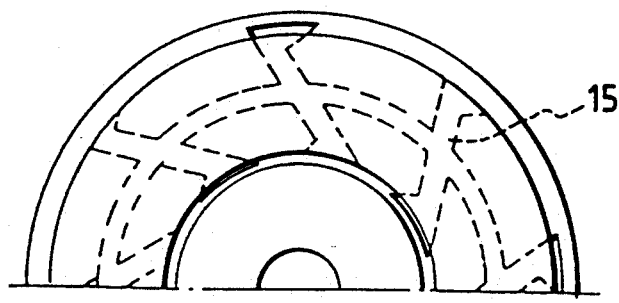
FIGS. 8A and 8B show a further modification.
Figure 8B:
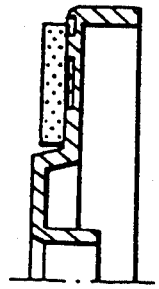
Figure 9A:
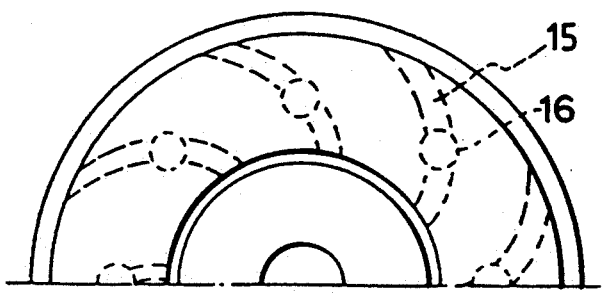
FIGS. 9A and 9B show a further modification.
Figure 9B:
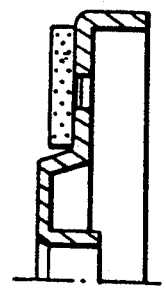
Figure 10A:
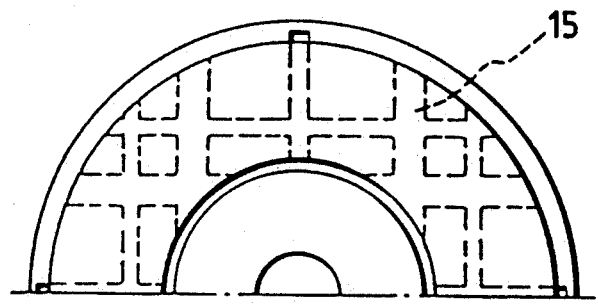
FIGS. 10A and 10B show a further modification of the embodiment of the present invention.
Figure 10B:
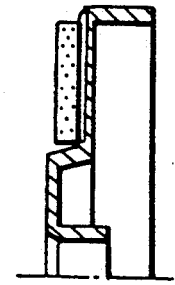

FIGS. 6A and 6B show an embodiment in which apertures 16 axially extending through a core plate are formed in addition to grooves on the core plate. The shape of the apertures may be circular, square or any other shape, as will be appreciated from the illustrative shapes in FIG. 6A.

FIGS. 7 to 10 show embodiments in which aspect 8 the hitherto shown embodiments are combined.

Figure 11A:
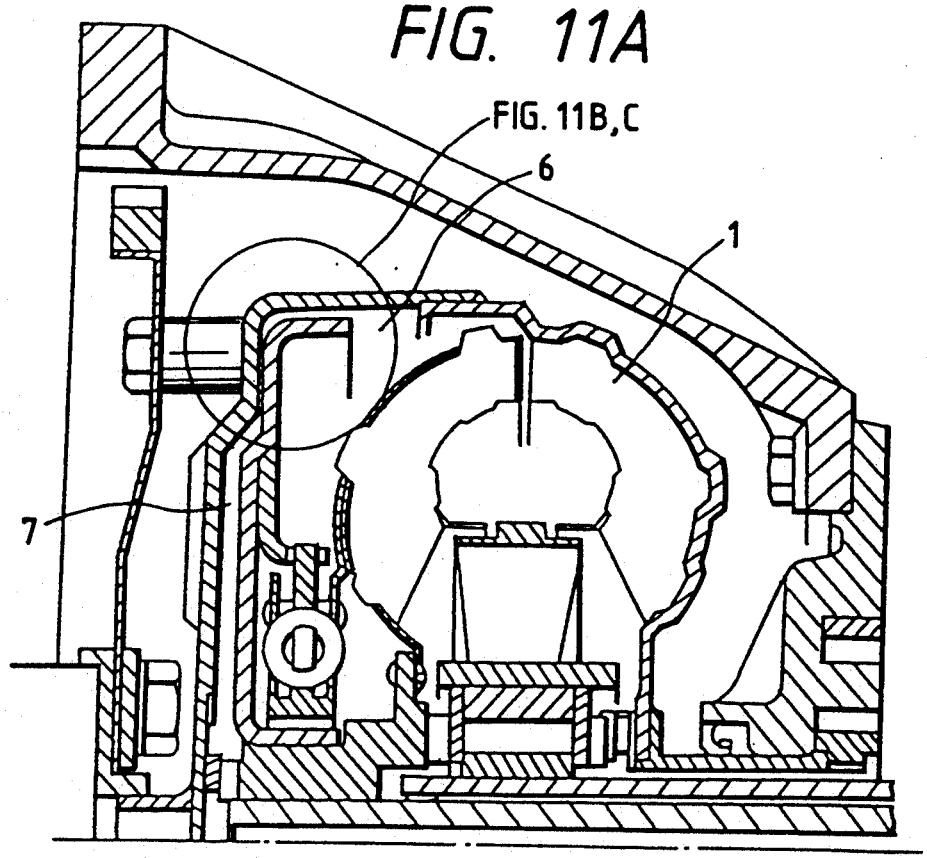
FIGS. 11A, 11B and 11C show a comparison between the flow of lubricating oil in a clutch plate according to the prior art and that in the clutch plate according to the present invention.
Figure 11B:
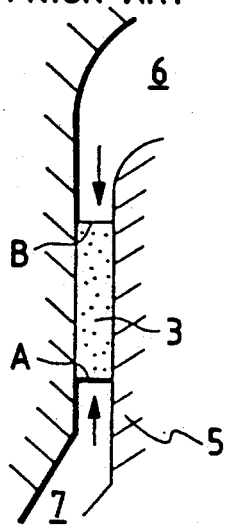
Figure 11C:
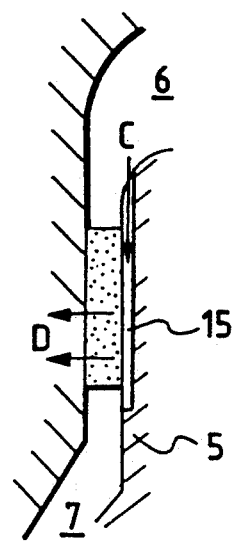
Figure 12A:
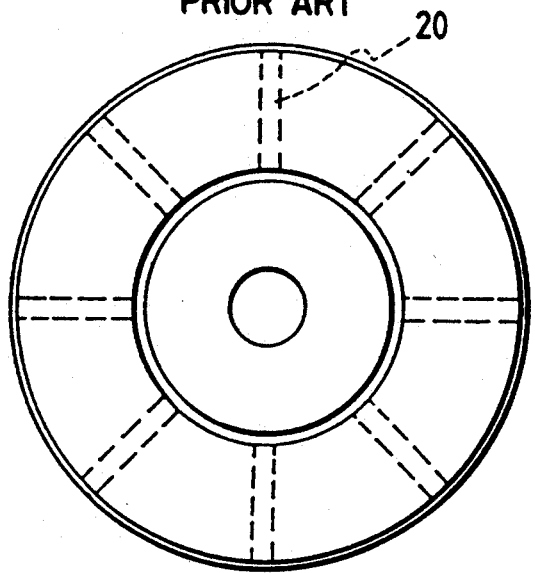
FIGS. 12A and 12B illustrate an example of the prior art in which oil grooves are formed in a facing.
Figure 12B:
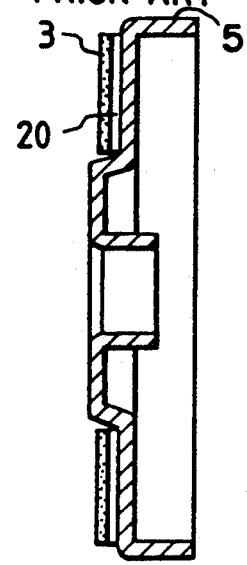

FIG. 11 shows the comparison between the situations of the flow of lubricating oil when use is made of the lock-up clutch according to the prior art and the plate formed with the oil grooves according to the present invention. FIG. 11A shows the frictionally driven state of the clutch, and FIGS. 11B and 11C are enlarged views of a sliding portion.

FIG. 11B shows the state of the flow of lubricating oil in the facing according to the prior art. Only the inner and outer end surfaces A and B of the facing 3 are in contact with the lubricating oil, and in this state, sufficient lubricating oil cannot be supplied to the whole surface of the facing which is a porous member.

In contrast, FIG. 11C shows the supplied state of lubricating oil in the present invention. By the differential pressure created in chambers 6 and 7 in a torque converter 1, the lubricating oil passes through the oil grooves formed on a core plate 5 and flows in the direction of arrow C. With the rotation of the lock-up clutch, vibration exerted on the facing 3 expedites the supply of the lubricating oil in the direction indicated by arrow D. Simultaneously therewith, the permeation of the lubricating oil by the pressure difference also takes place. In this manner, sufficient lubricating oil is always supplied to the facing and carbonization, peeling or the like by friction is prevented.

Figure 13:
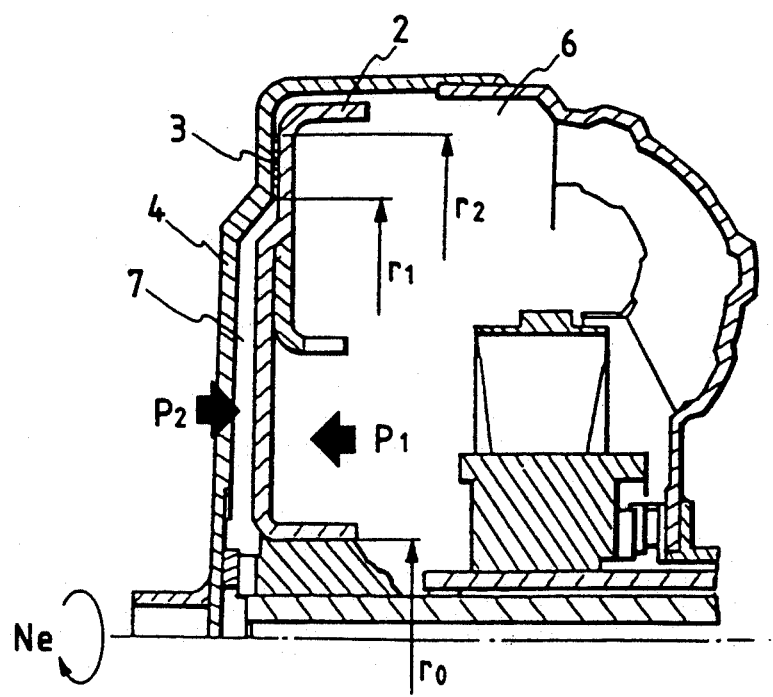
FIG. 13 illustrates the cross-section of a torque converter.

FIG. 13 shows the cross-section of a torque converter above the center thereof in a simplified manner. A lock-up clutch 2 is disengaged and engaged with a converter cover 4 by the difference between the pressure $P_1$ in the front chamber 6 of the clutch and the pressure $P_2$ in the rear chamber 7 of the clutch. That is, if $P_2$ and $P_1$ become equal to each other, the facing 3 will separate from the cover 4, and if $P_2$ becomes smaller than $P_1$, the facing 3 will come into frictional engagement with the cover.

Figure 14:
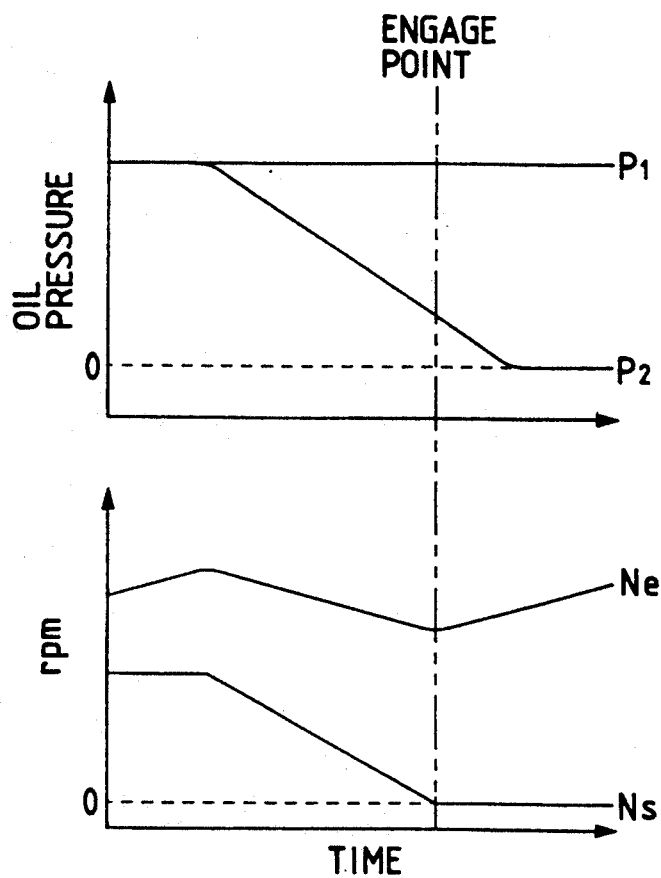
FIG. 14 illustrates variations in the pressure and the number of revolutions during the operation of a lock-up clutch.
Figure 15:
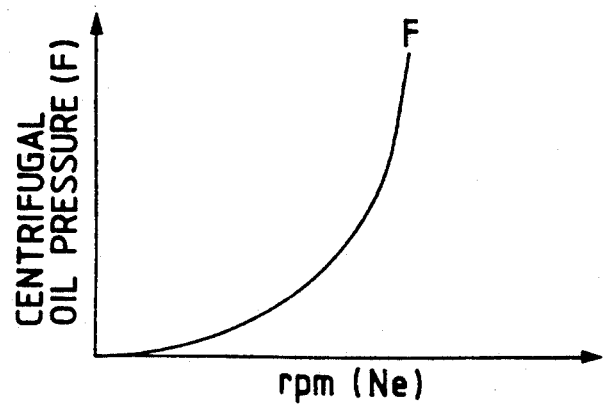
FIG. 15 shows a variation in the urging force by the oil pressure difference of the lock-up clutch.

FIG. 14 shows variations in the oil pressure and the number of revolutions per minute with time during the frictional engagement of the lock-up clutch. FIG. 15 shows a variation in the urging force F by centrifugal oil pressure. The urging force of the clutch is expressed by the following equation (1) or (2):

$$F = 7.5 \times 10^{-9} \times N_e^2 \times (r_2^2 - r_0^2)^2 \tag{1}$$

$$F = 7.5 \times 10^{-9} \times N_s^2 \times (r_2^2 - r_1^2)^2, \tag{2}$$

where
- $N_e$: input rotation (the number of revolutions of the converter cover),
- $N_s$: the number of relative revolutions of the converter cover and the lock-up clutch,
- $r_0$: shaft radius,
- $r_1$: the radius of the inner periphery of the facing,
- $r_2$: the radius of the outer periphery of the facing.

Equation (1) refers to a case where oil is not present in the chamber 7, and equation (2) refers to a case where oil is present in the chamber 7. The lock-up clutch transmits a torque by the facing contacting with the converter cover, but since the fulcrum receiving the urging force is the inner peripheral portion of the facing, the distribution of stress applied to the facing differs between the inner periphery and the outer periphery, and this adversely affects the compression fatigue life of the facing. If in order to improve this point, a valve mechanism is provided in each of the grooves formed on the plate, the pressure difference applied to the front and rear of the clutch plate will be made adequate and the peeling life of the facing will be improved. The cooling lubricating oil supplied to the facing will also be made adequate and the heat resisting property of the facing will also be improved.

Figure 16A:
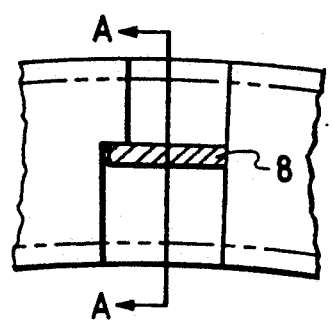
FIGS. 16A and 16B show a first embodiment of a valve mechanism provided in a groove.
Figure 16B:
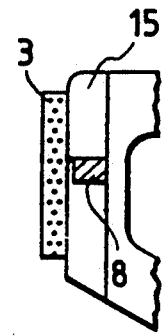
Figure 17A:
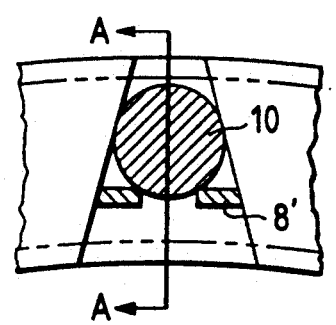
FIGS. 17A and 17B show a second embodiment of the valve mechanism provided in the groove.
Figure 17B:
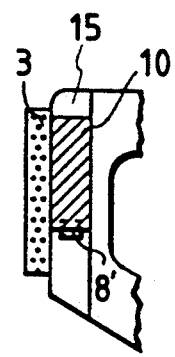
Figure 18A:
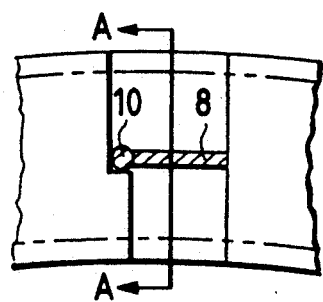
FIGS. 18A and 18B show a third embodiment of the valve mechanism provided in the groove.
Figure 18B:
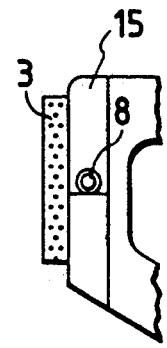
Figure 19A:
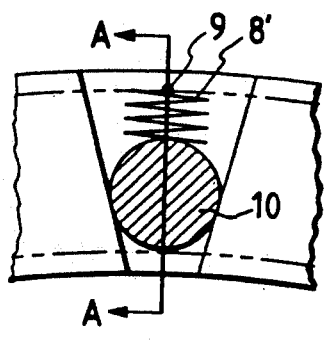
FIGS. 19A and 19B show a fourth embodiment of the valve mechanism provided in the groove.
Figure 19B:
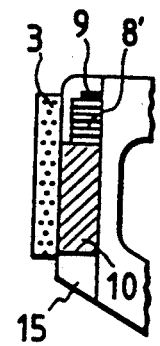
Figure 20A:
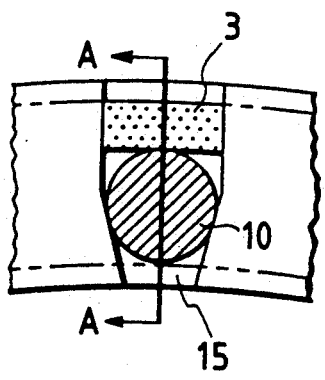
FIGS. 20A and 20B show a fifth embodiment of the valve mechanism provided in the groove.
Figure 20B:
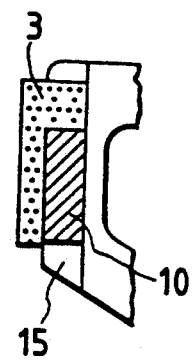

FIGS. 16 and 17 show examples of a valve operated by the pressure difference between the inner and outer peripheries of the facing. In FIG. 16, the reference numeral 8 designates an elastic member of rubber or the like. When the pressure on the outer peripheral side of the plate becomes high, the elastic member is deformed toward the inner peripheral side and oil flows in the groove. In FIG. 17, the reference numeral 10 denotes a valve member which receives the oil pressure difference. When a predetermined pressure difference is created, the valve member 10 moves toward the inner peripheral side and biases an elastic member 8' to thereby make the flow of oil possible. FIGS. 18 to 20 show embodiments of a valve utilizing a centrifugal force. In FIGS. 18 and 19, when the valve member 10 receives a predetermined or greater centrifugal force, it is displaced toward the outer peripheral side against the force of the biasing member 8, 8' to thereby permit the flow of oil in the groove. In the case of FIG. 20, a portion provided by extending a portion of the facing 3 is utilized as the biasing member. The facing is a porous elastic member and therefore can be utilized as a biasing member which supports the valve member.

According to the present invention, oil grooves for supplying lubricating oil are formed in the core plate opposite to the friction side surface of the facing 3 of the lock-up clutch which is exposed to a high temperature during frictional engagement, whereby the supply of the lubricating oil to the facing can be secured to thereby prevent the carbonization, peeling or the like of the facing.

Also, by incorporating a valve mechanism into each of the oil grooves formed in the core plate, the pressure difference between the front and rear of the plate is adjusted, whereby the durability and heat resisting property of the facing can be improved.

What is claimed is:

1. A lock-up clutch for a torque converter, comprising a frictional facing attached to an annular surface of a core plate, and a plurality of oil grooves formed in said surface of said core plate, each oil groove having therein valve means including a valve member displaceable from a closed position to an open position in response to centrifugal force generated by rotation by said core plate on an axis of said core plate.

2. A lock-up clutch according to claim 1, wherein said valve member moves toward an outer periphery of said surface when displaced from said closed position to said open position.

3. A lock-up clutch according to claim 1, wherein said valve member is biased toward said closed position by a biasing member and moves toward said open position when said centrifugal force exceeds the biasing force of said biasing member.

4. A lock-up clutch according to claim 3, wherein said biasing member is constituted by an extended portion of said facing.

5. A lock-up clutch for a torque converter, comprising a frictional facing attached to an annular surface of a core plate, and a plurality of oil grooves formed in said surface of said core plate, each oil groove having therein valve means including a valve member displaceable from a closed position to an open position in response to a pressure differential between inner and outer peripheries of said facing when the pressure at the outer periphery is greater than that at the inner periphery.

6. A lock-up clutch according to claim 5, wherein said valve member moves toward an inner periphery of said surface when displaced from said closed position to said open position.

* * * * *